United States Patent [19]

Bourton

[11] 3,807,593

[45] Apr. 30, 1974

[54] DRAWBAR LOCKING DEVICE FOR A TILTABLE TRAILER

[76] Inventor: Hubert Bourton, Star Rt., Waterville, Wash. 98858

[22] Filed: Mar. 14, 1973

[21] Appl. No.: 341,041

[52] U.S. Cl.............. 241/505, 298/5, 214/506, 280/414
[51] Int. Cl............................................. B60p 1/28
[58] Field of Search ......... 280/400; 298/5; 214/505, 214/506

[56] References Cited
UNITED STATES PATENTS

| 2,925,186 | 2/1960 | Anderson et al. | 214/506 |
| 3,102,649 | 9/1963 | Whalen | 214/506 |
| 3,342,508 | 9/1967 | Thomas | 214/505 X |
| 3,472,406 | 10/1969 | Slipp | 214/505 |
| 3,604,579 | 9/1971 | Jenkens | 214/505 |
| 3,620,397 | 11/1971 | Gagnon | 214/506 |
| 3,672,523 | 6/1972 | Albert | 214/506 |

Primary Examiner—Leo Friaglia
Attorney, Agent, or Firm—Wells, St. John & Roberts

[57] ABSTRACT

A drawbar locking device is described for releasably locking a drawbar to a trailer bed that is tiltable and pivotable relative to the drawbar. The locking device has mating female and male elements to secure the drawbar in a forward extending longitudinal position. A safety means is provided to hold a latching means in position to prevent the elements from disengaging.

6 Claims, 8 Drawing Figures

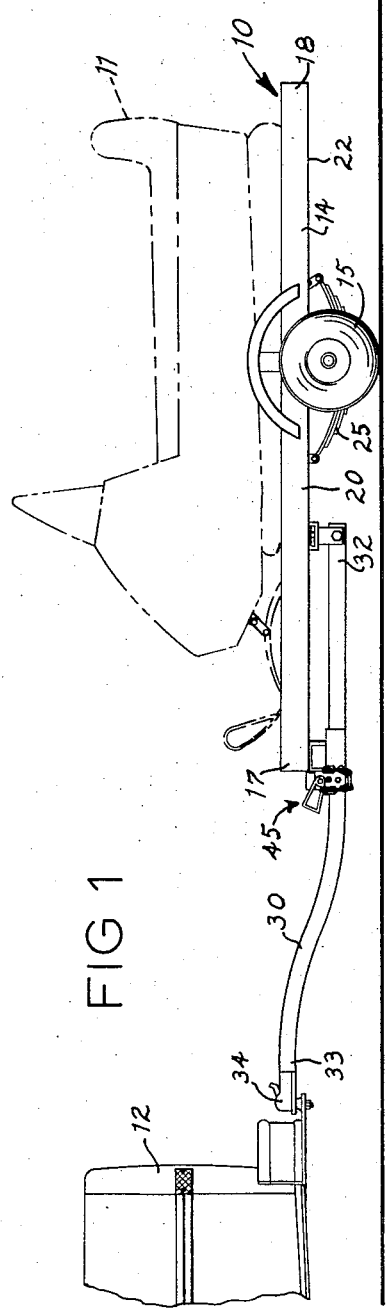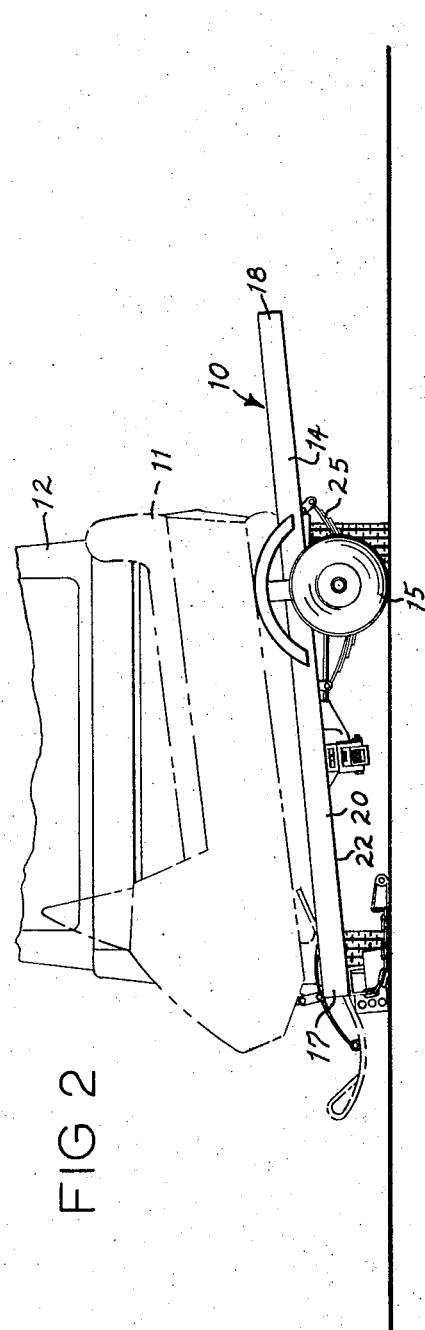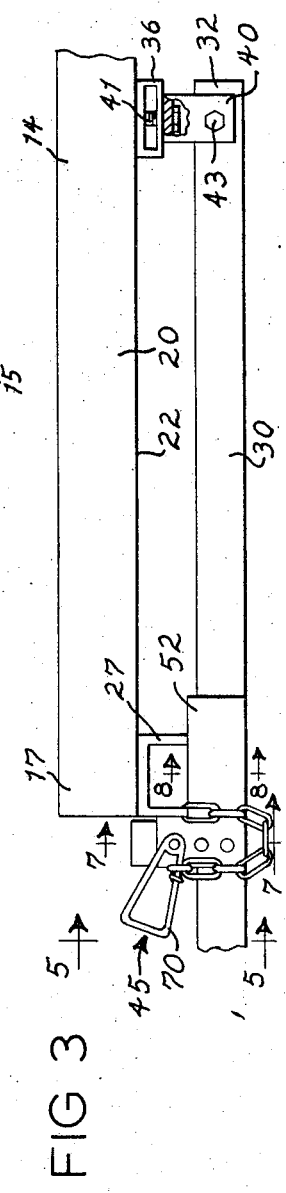

DRAWBAR LOCKING DEVICE FOR A TILTABLE TRAILER

BACKGROUND OF THE INVENTION

This invention relates to drawbar locking devices and more particularly to drawbar locking devices for tiltable and pivotable trailer beds.

With the advent of the snowmobiles and other types of recreational vehicles, it has been desirable to provide a trailer for carrying such vehicles on roadways. Many of the snowmobiles and recreational vehicles are not provided with means to propel the vehicles in a reverse direction. Therefore, it is desirable in loading the vehicles on the trailer to lower the back of the trailer and drive the vehicle forward onto the trailer. After one has obtained his destination it is desirable to lower the front of the trailer to ground level and drive the vehicles forward off the trailer. With the traditional tiltable trailer, it is difficult to lower the front end since the drawbar is in the way and prevents the front end of the trailer from being brought to ground level. Recently, tiltable trailers have been provided in which the drawbar is pivotable to one side to allow the front end of the trailer to approach the ground to enable a snowmobile or all terrain vehicle to be driven forward off the trailer.

However, it has been found very difficult to obtain a very simple and yet effective way of releasably locking the drawbar in a forward position to secure the bed to the drawbar and to prevent the inadvertent release of the drawbar from the bed. Serious damage and injury could result if the trailer bed inadvertently disconnected from the drawbar.

One of the principal objects of this invention is to provide a drawbar locking device that is very simple in operation yet very reliable to enable a person to very conveniently and readily unload and load the recreational vehicles onto the trailer with a minimum of security and then to lock the drawbar to the bed to prevent their disassociation.

A further object of this invention is to provide a very simple drawbar locking device that can be readily manufactured and placed on a trailer with a minimum of effort and expense.

An additional object of this invention is to provide a drawbar locking device that helps in centering the drawbar with respect to the bed as the trailer is tilted back to its natural position.

These and other objects and advantages of this invention become apparent upon reading the following detailed description of a preferred embodiment.

BRIEF DESCRIPTION OF THE DRAWINGS

A preferred embodiment of this invention is illustrated in the accompanying drawings, in which:

FIG. 1 illustrates a side elevational view of a tiltable trailer carrying a snowmobile in which the drawbar for the trailer extends forward of the front end of the trailer;

FIG. 2 is a view similar to FIG. 1 except showing the drawbar pivoted to one side of the trailer to permit the forward end of the trailer to drop to the ground to enable the snowmobile to be driven forward off the trailer;

FIG. 3 is an enlarged fragmentary side view illustrating a drawbar locking device for securing the drawbar to the trailer in the forward extending position;

DETAILED DESCRIPTION OF A PREFERRED EMBODIMENT

Figure 4:
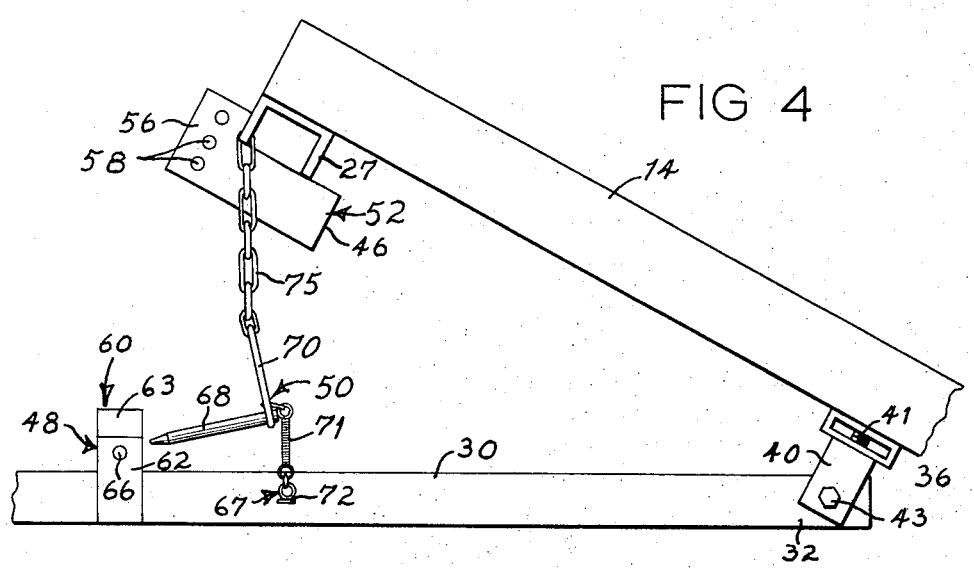
FIG. 4 is a fragmentary side view similar to FIG. 3 except showing the drawbar locking device being released to permit the bed of the trailer to tilt rearward to assist in the loading of the snowmobile or other type of recreational vehicle onto the trailer.

Now referring in detail to the drawings, there is illustrated in FIG. 1 a trailer 10 for receiving and carrying a recreational vehicle such as a snowmobile 11 shown in dotted line. Other types of recreational vehicles such as all terrain vehicles (ATV) and all seasonal vehicles (ASV) may be carried by the trailer. As illustrated, the trailer 10 is connected to a towing vehicle 12.

The trailer 10 includes a trailer bed 14 that is supported by ground engaging wheels 15. The bed 14 has a front end 17 and a rear end 18 in the longitudinal direction of the trailer. The bed 14, in a transverse direction has lateral sides 20. The bed 14 has an underside 22. Springs 25 operatively interconnect the underside of the bed 14 to a wheel axle, which is not shown. Adjacent the front end 17 is a bed crossbar 27 along the front end of the bed.

The trailer 10 includes a drawbar 30 which in this specific embodiment is made of a tubular material having a rear end 32 and a front end 33. The front end 33 extends forward from the front end 17 of the bed and interconnects to the towing vehicle 12 through a hitch 34. Various types of hitches may be utilized depending upon the circumstance. The bed 14 has a bracket 36 (FIGS. 3 and 4) affixed to the underside 22 forward of the wheels 15 for pivotally interconnecting to the rear end 32 of the drawbar 30. A U-shaped bracket 40 is pivotally connected to the bracket 36 through a bolt 41 defining a vertically oriented axis about which the drawbar is pivotable. A bolt 43 extends through the U-shaped bracket 40 and the rear end 32 to permit the bed to tilt in a vertical direction about the horizontally oriented axis defined by the bolt 43. In this manner the bed 30 may be pivoted upward as illustrated in FIG. 4 to facilitate the on-loading of the recreational vehicles on the trailer. To enable the vehicles to be driven forward off the front end 17 of the trailer bed, a drawbar is pivoted from the forward normal position to a side 20 as illustrated in FIG. 2. The drawbar 30 may be said to be pivotally connected to the bed 14 for pivotal movement about both a horizontal axis to enable the bed to tilt in relation to the drawbar and to enable the drawbar to be swung to one of the sides about a vertical axis defined by the bolt 41, to permit the forward end 17 of the bed to be brought to the ground level.

The principal feature of this invention in combination with this type of trailer involves a drawbar locking device 45 for releasably locking the drawbar in the forward position during normal operation and to enable the drawbar to be convenient and easily released to facilitate the on-loading and off-loading of recreational vehicles.

The drawbar locking device 45 includes a female element 46 (FIG. 4) that may be rigidly affixed to the drawbar at a location corresponding to the front end 17 of the bed. Additionally, the locking device 45 includes a latching means 50 for releasably latching the male and female elements 48 and 46 together to prevent unintentional disassociation. Should the male and female elements become detached while a trailer is being pulled, disastrous results would occur. Thus it is a primary objective of this invention to provide a locking device that is as foolproof as possible which may be readily manipulated to minimize the amount of time required to on-load and off-load the recreational vehicles.

Figure 7:
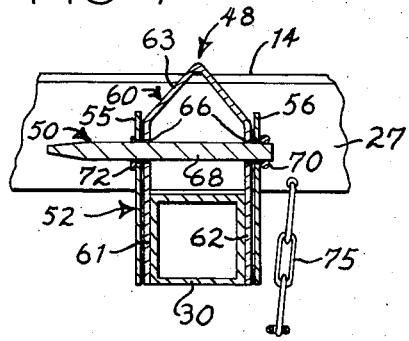
FIG. 7 is a vertical cross-sectional view taken along line 7—7 in FIG. 3.
Figure 8:
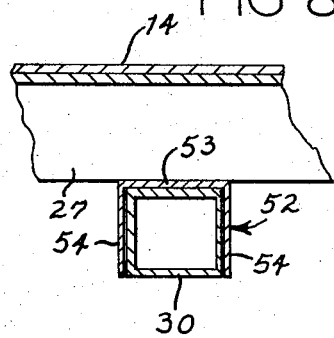
FIG. 8 is a vertical cross-sectional view taken along line 8—8 in FIG. 3.

The female element 46 includes an inverted U-shaped or saddle-shaped section 52 that is affixed preferably through welding to the crossbar 27 as illustrated in the drawings. The saddle section 52 includes a crotch piece 53 (FIG. 8) that extends between downward extending sides or legs 54. The distance between the sides or legs 54 corresponds to the width of the drawbar. The saddle section 52 receives the drawbar therein to normally maintain the drawbar in the longitudinal position and prevents the drawbar from swinging laterally. The female element also includes ears 55 and 56 (FIGS. 5 and 7) that extend forward and upward from the saddle section. The ears 55 and 56 have corresponding apertures 58 formed therein at vertical increments to adjust the angle of orientation of the bed 14 with respect to the drawbar 30.

The male element 48 also includes an inverted U-shaped section having sides 61 and 62 for being received between the ears 55 and 56. The sides 61 and 62 are secured to the sides of the drawbar by welding or the like. The inverted U-shaped section 60 includes a wedge-shaped top section 63 that extends upward from the sides 61 and 62 forming inclined surfaces to guide the male element 48 into the female element 46. Apertures 66 (FIGS. 4 and 7) are formed in the sides 61 and 62 immediately above the drawbar to be aligned with a set of apertures 58. The vertical orientation of the bed with respect to the drawbar may be adjusted by aligning the apertures 66 with different sets of the apertures 58.

Figure 6:
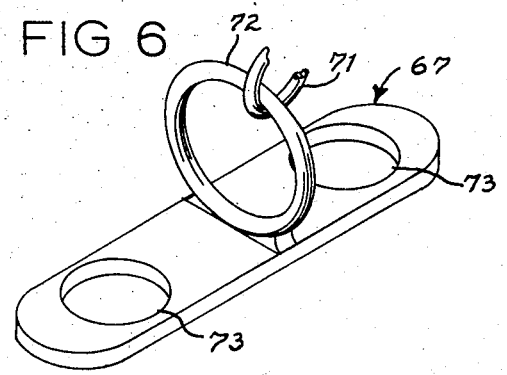
FIG. 6 is a detail perspective view of a portion of the safety means for securing the drawbar locking device.
Figure 5:
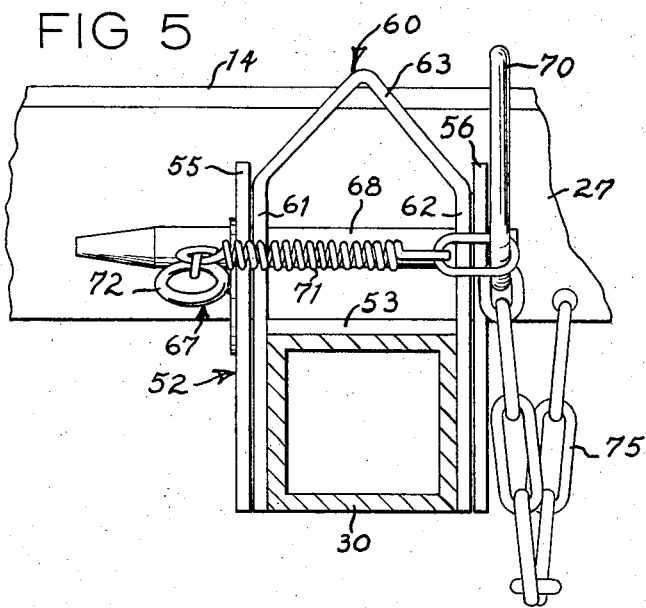
FIG. 5 is a vertical cross-sectional view taken along line 5—5 in FIG. 3 and illustrating a front view of the drawbar locking device.

The latching means 50 includes a rod pin 68 that extends through the apertures 58 and 66 to releasably secure the female and male elements 46, 48 together to hold the drawbar in the forward longitudinal position. A handle means 70 is formed at a head end of the pin 68 to facilitate the insertion of the rod pin through the apertures 66 and 58. A safety means 67 is provided to hold the rod pin 68 in the aperture. The safety means 67 includes a tension spring 71 that extends from the handle means 70 to a ring element 72 that is illustrated in detail in FIG. 6. The ring element 72 has an aperture 73 formed therein to enable the ring element to be slid over the other end of the rod pin 68. The normal distance between the handle 70 and the ring element 72 is less than the length of the rod so that in order to lock the pin 68 in the apertures 58, 66 tension must be placed on the tension spring 71 to extend the length of the safety means to enable one to insert the ring element 72 over the other end of the rod pin 68 as illustrated in FIG. 5.

A safety chain 75 extends between the rod pin 68 and the frame member 27 to prevent the loss of the latching means 50 when the latching means is disconnected.

To off-load a vehicle, one merely needs to release the locking means 50 and raise the front end 17 of the bed to disconnect the male and female elements and rotate the bed relative to the drawbar and drop the front end to the ground as illustrated in FIG. 2.

It should be understood that the above described embodiment is simply illustrative of the principles of this invention and numerous other embodiments may be readily devised without deviating therefrom. Therefore, only the following claims are intended to define this invention.

What is claimed is:
1. In a tiltable and pivotable trailer having:
   a wheel supported bed for carrying recreational vehicles such as snowmobiles in which the bed extends longitudinally between a front bed end and rear bed end and transversely between lateral bed sides;

a drawbar having a forward end normally extending beyond the front bed end to attach to a towing vehicle and a rear end operatively pivotally connected to the bed intermediate the bed ends and sides about a vertical axis and a horizontal axis to enable the trailer bed to tilt upward with respect to the drawbar to bring the rear bed end to ground level to facilitate the on-loading of recreational vehicles and to enable the drawbar to be swung horizontally from a forward extending position to one of the lateral sides to permit the front bed end to be brought to ground level to facilitate the off-loading of the vehicle;
   the improvement comprising a releasable drawbar locking device for releasably securing the drawbar to the bed in the forward extending position;
   said locking releasable locking device comprising a male element means for fixing to the front end of the drawbar; and
   a female element means for fixing to the forward bed end to receive the front end of the drawbar and the male element therein to prevent the drawbar from pivoting about the vertical axis;
   latching means for releasably securing the female and male element means together to prevent the bed from tilting with respect to the drawbar; and
   said female element means including an inverted U-shaped section for receiving the drawbar therein with downward projecting sides straddling the drawbar to prevent horizontal movement of the drawbar and a pair of spaced ears extending forward and upward from the inverted U-shaped section to receive the male element therebetween.

2. The releasable drawbar locking device as defined in claim 1 wherein said male element means has a wedge-shaped upper end section for projecting between the spaced ears to facilitate the alignment and centering of the drawbar with respect to the female element means.

3. The releasable drawbar locking device as defined in claim 2 wherein said male element means has side plate sections affixed to the drawbar that extend upward therefrom to the wedge shaped upper end section.

4. The releasable drawbar locking device as defined in claim 1 wherein the male and female element means have corresponding apertures formed therein which are alignable with each other and wherein the latching means includes a rod extendable through aligned apertures to secure the male and female elements together and a safety means for securing the rod in the apertures.

5. The releasable drawbar locking device as defined in claim 4 wherein the safety means includes a tension spring having one end operatively fixed to one end of the rod and an opposite end operatively connected to a ring element in which the ring element has an aperture to enable the ring element to fit over the other end of the rod; in which the free length of the safety means is less than the length of the rod so that in order to fit the ring element over the other end of the rod tension must be applied to the ring to extend the length of the safety means.

6. The releasable drawbar locking device as defined in claim 1 wherein the rear end of the drawbar is pivotally connected to the trailer bed forward of the supporting wheel.

* * * * *